US009529805B2

(12) United States Patent
Thadikaran et al.

(10) Patent No.: US 9,529,805 B2
(45) Date of Patent: Dec. 27, 2016

(54) SYSTEMS AND METHODS FOR PROVIDING DYNAMIC FILE SYSTEM AWARENESS ON STORAGE DEVICES

(75) Inventors: Paul J. Thadikaran, Rancho Cordova, CA (US); Nicholas D. Triantafillou, Portland, OR (US); Paritosh Saxena, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 81 days.

(21) Appl. No.: 13/976,378

(22) PCT Filed: Dec. 22, 2011

(86) PCT No.: PCT/US2011/067016
§ 371 (c)(1),
(2), (4) Date: Jun. 26, 2013

(87) PCT Pub. No.: WO2013/095566
PCT Pub. Date: Jun. 27, 2013

(65) Prior Publication Data
US 2013/0275479 A1    Oct. 17, 2013

(51) Int. Cl.
G06F 17/30    (2006.01)
G06F 3/06    (2006.01)
G06F 21/56    (2013.01)
G06F 21/80    (2013.01)

(52) U.S. Cl.
CPC ......... *G06F 17/30082* (2013.01); *G06F 3/062* (2013.01); *G06F 3/0643* (2013.01); *G06F 3/0673* (2013.01); *G06F 21/562* (2013.01); *G06F 21/80* (2013.01)

(58) Field of Classification Search
USPC .......... 707/827, 634, 692, 822; 726/260, 24
See application file for complete search history.

(56) References Cited

U.S. PATENT DOCUMENTS

| 7,788,521 B1* | 8/2010 | Sim-Tang ............... 714/4.12 |
| 2006/0015731 A1* | 1/2006 | Lakshmi Narayanan .... 713/176 |
| 2010/0082715 A1* | 4/2010 | Dohm ................... G06F 3/0608 707/822 |
| 2010/0083381 A1* | 4/2010 | Khosravi et al. ............... 726/24 |
| 2010/0154062 A1* | 6/2010 | Baram .................. G06F 21/564 726/24 |
| 2010/0198788 A1* | 8/2010 | Sim-Tang .................. 707/634 |

(Continued)

FOREIGN PATENT DOCUMENTS

EP    2 249 254 A2 *    10/2010    ........... G06F 4/48

OTHER PUBLICATIONS

Notification of Transmittal of the International Search Report for PCT Counterpart Application No. PCT/US2011/067016, 5 pgs., (Aug. 30, 2012).

(Continued)

*Primary Examiner* — Hung T Vy
(74) *Attorney, Agent, or Firm* — Nicholson De Vos Webster & Elliott LLP (57) ABSTRACT

Systems and methods for providing awareness of a host file system on a storage device are described. In one embodiment, a storage device includes a host interface and a file awareness block. The host interface provides an interface between a host and the storage device. The file awareness block provides an awareness of the host file system to the storage device.

14 Claims, 10 Drawing Sheets

(56) References Cited

U.S. PATENT DOCUMENTS

2012/0136841 A1* 5/2012 Ambat .................. G06F 3/0608
707/692

OTHER PUBLICATIONS

Taiwanese Application No. 101146371, Official Letter and Search Report, 9 pgs. (Aug. 29, 2014).
Taiwanese Application No. 101146371, Official Letter, 6 pgs. (Mar. 30, 2015).
European Search Report in corresponding EP Application No. 11878131.9, dated Jun. 23, 2015, 8 pages.

* cited by examiner

```
┌─────────────────────────────────────────────────────────────────────────┐
│ SEND ONE OR MORE SET FILE UPDATE MESSAGES TO THE STORAGE DEVICE FOR     │
│ ALL FILES THAT THE STORAGE DEVICE NEEDS TO BE AWARE OF USING A FILE     │
│                         AWARENESS BLOCK                                 │
│                              502                                        │
└─────────────────────────────────────────────────────────────────────────┘
                                    │
                                    ▼
┌─────────────────────────────────────────────────────────────────────────┐
│      SEND ONE OR MORE GET FILE UPDATE MESSAGES TO THE STORAGE DEVICE    │
│                              504                                        │
└─────────────────────────────────────────────────────────────────────────┘
```

FIG. 5

```
┌─────────────────────────────────────────────────────────────────────────┐
│      SEND ONE OR MORE SET FILE UPDATE MESSAGES TO THE STORAGE DEVICE    │
│                              602                                        │
└─────────────────────────────────────────────────────────────────────────┘
                                    │
                                    ▼
┌─────────────────────────────────────────────────────────────────────────┐
│         SEND ANOTHER SET FILE UPDATE MESSAGE TO THE STORAGE DEVICE      │
│                              604                                        │
└─────────────────────────────────────────────────────────────────────────┘
```

FIG. 6

```
┌─────────────────────────────────────────────────────────────────────────┐
│      SEND ONE OR MORE SET FILE UPDATE MESSAGES TO THE STORAGE DEVICE    │
│                              702                                        │
└─────────────────────────────────────────────────────────────────────────┘
                                    │
                                    ▼
┌─────────────────────────────────────────────────────────────────────────┐
│    PERFORM UPDATES TO A BACKUP FILE IF NECESSARY WITH SET FILE UPDATE   │
│                             COMMANDS                                    │
│                              704                                        │
└─────────────────────────────────────────────────────────────────────────┘
                                    │
                                    ▼
┌─────────────────────────────────────────────────────────────────────────┐
│ SEND AT THE TIME OF RESTORE A GET FILE UPDATE (NTFS1, BACKUP1) MESSAGE  │
│  TO MAKE THE NEW BACKUP FILE DATA AVAILABLE TO THE HOST FILE SYSTEM     │
│                              706                                        │
└─────────────────────────────────────────────────────────────────────────┘
```

SYSTEMS AND METHODS FOR PROVIDING DYNAMIC FILE SYSTEM AWARENESS ON STORAGE DEVICES

CROSS-REFERENCE TO RELATED APPLICATION

This patent application is a U.S. National Phase Application under 35 U.S.C. §371 of International Application No. PCT/US2011/067016, filed Dec. 22, 2011, entitled SYSTEMS AND METHODS FOR PROVIDING DYNAMIC FILE SYSTEM AWARENESS ON STORAGE DEVICES.

TECHNICAL FIELD

The present application relates to systems and methods for providing dynamic file system awareness on storage devices.

BACKGROUND

Security is an important problem for any compute platform having data that resides in storage. A rootkit is software that enables continued privileged access to a computer while actively hiding its presence from administrators by subverting standard operating system (OS) functionality or other applications. Rootkit drivers modify the data that is made available to all applications and the OS. Malware threats are growing at exponential rate. Malware (e.g., low level malware like rootkits) is getting stealthier and is attacking the host (personal computer) system stack far below the protection provided by anti-virus/anti-malware (AV/AM) approaches. Once low level malware has infected the system, a state of the system as seen by AV/AM is in control of the malware.

The AV/AM approaches provided by independent software vendor (ISV) applications may include forming a secure tunnel with the storage device that prevents and detects the data modification that is done by rootkits. This secure tunnel is used to transfer raw data with no intelligence on the type or how the data is organized in the storage device.

In any host (e.g., client) system, there exists a host file system to organize user and system data as files. Files include logical blocks of data and a typical size of the smallest block is 512 bytes or 1K bytes and is called a logical block address (LBA) or a sector. A file is a collection of LBAs or sectors that are not necessarily contiguous. For example in the Unix file system, associated with each file is a concept of "Mode" or information node. Each Mode consists of a list of up to 10 LBA's, pointer to a single indirect block—which is a list of up to 256 LBA addresses, pointer to a double indirect block—which is a list of up to 256 single indirect blocks, and pointer to triple indirect block—which is a list of up to 256 double indirect blocks. An Mode is a list of 13 addresses. The Mode gives a file to LBA mapping. In the Windows file system (NTFS) a similar file to LBA mapping exists even though the mapping function may be different than the Mode scheme used in Unix.

Any system may have several files and these files are organized as directories. In the case of the Unix system a directory is also organized as an Mode, which contains files or other directories. Similarly, in NTFS, there is a master file table (MFT), which contains files and/or directories. Any given file system provides services that enable a user to open, read, write, or delete a file. In addition, several other maintenance servers are provided such as permissions, size, etc.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Systems and methods for creating dynamic file system awareness for application needs on storage devices are described. Embodiments of the invention provide a communication framework from a host to a storage device to provide file level awareness to the storage device and also provide the device with properties that will enable the device to do operations independent or concurrent to the host. The present design implements a file system or portions of the file system in the storage device with the ability to perform updates to the file system against a previously set baseline. If the organization of data into a file system is visible to the storage device then there arises the opportunity to perform certain "in storage" computations such as doing an anti-virus scan, computing signatures for critical files on an ongoing basis, etc.

In the following description, numerous specific details such as logic implementations, sizes and names of signals and buses, types and interrelationships of system components, and logic partitioning/integration choices are set forth in order to provide a more thorough understanding. It will be appreciated, however, by one skilled in the art that embodiments of the invention may be practiced without such specific details. In other instances, control structures and gate level circuits have not been shown in detail to avoid obscuring embodiments of the invention. Those of ordinary skill in the art, with the included descriptions, will be able to implement appropriate logic circuits without undue experimentation.

In the following description, certain terminology is used to describe features of embodiments of the invention. For example, the term "logic" is representative of hardware and/or software configured to perform one or more functions. For instance, examples of "hardware" include, but are not limited or restricted to, an integrated circuit, a finite state machine or even combinatorial logic. The integrated circuit may take the form of a processor such as a microprocessor, application specific integrated circuit, a digital signal processor, a micro-controller, or the like. The interconnect between chips each could be point-to-point or each could be in a multi-drop arrangement, or some could be point-to-point while others are a multi-drop arrangement.

Figure 1:
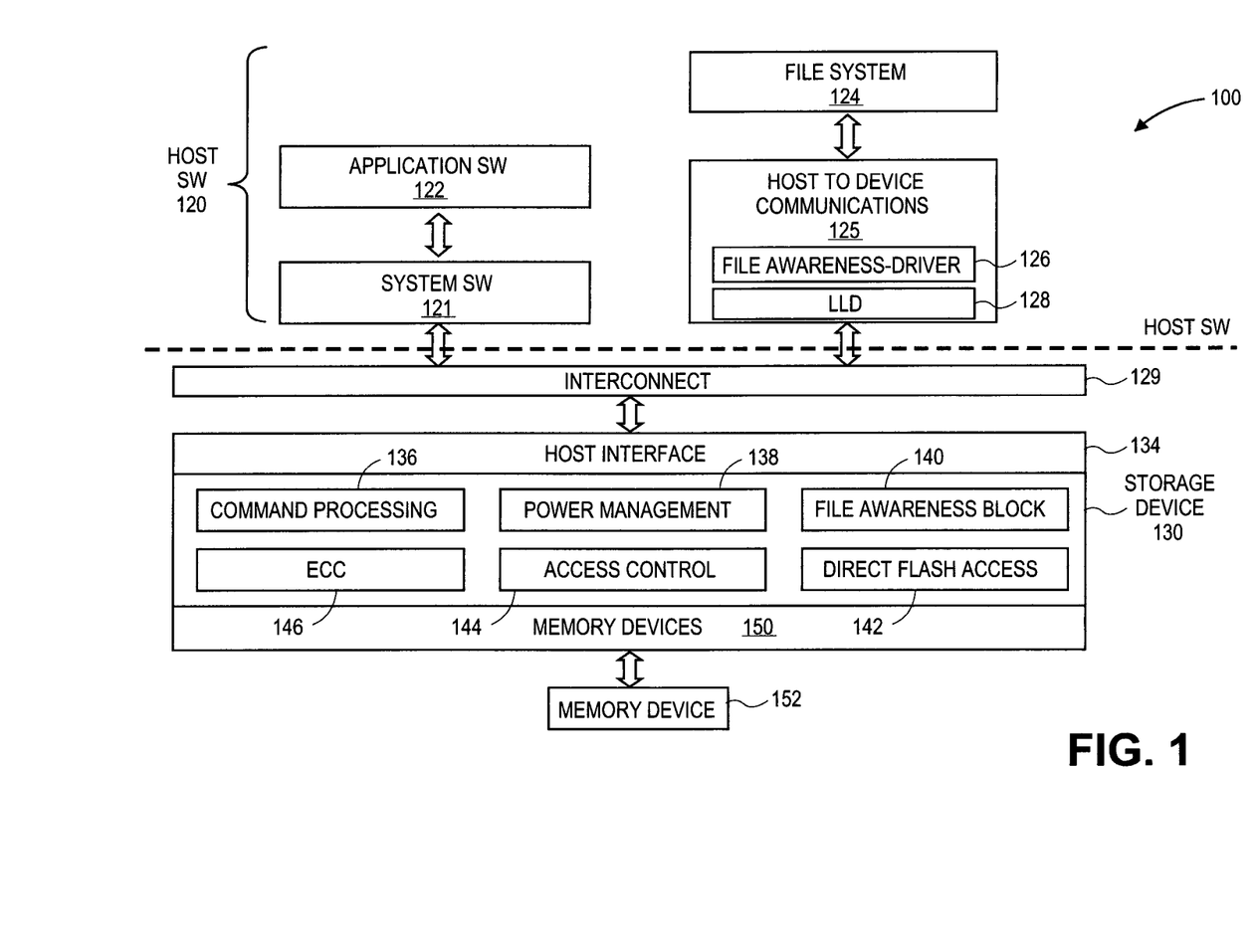
FIG. 1 illustrates a system having dynamic file system awareness in a storage device of the system in accordance with one embodiment of the invention.

FIG. 1 illustrates a system having dynamic file system awareness in a storage device of the system in accordance with one embodiment of the invention. The host software 120 of the system 100 includes system software 121 and application software 122. A file system 124 in the host system 100 is communicatively coupled to a host device communications block 125 that includes a file awareness driver 126 and low-level drivers (LLD) 128. The host device communications block communicates with storage device 130 via interconnect 129 and host interface 134.

The storage device 130 includes firmware and hardware including a host interface 132 (e.g., SATA, USB, PCIe, eMMC, etc.), command processing 136, power management 138, file awareness block 140, direct memory access 142 (e.g., direct flash access), access control 144, error correction code module (ECC) 146, memory devices 150 (e.g., ONFI and other NAND devices), and memory device 152 (e.g., non-volatile memory, NAND, etc.). The host to the device file system interface is provided by the file awareness driver 126 and the file awareness block 140 via interconnect 129 and host interface 134.

Embodiments of the invention enable file system awareness within the storage device, which supports a subset of the services provided by the host file system 124. To enable this awareness, a pre-defined set of synchronizing messages are sent between the host application/agent via file awareness driver 126 that is authorized to communicate with the device agent (e.g., file awareness block 140) that is resident in the storage device. In this scheme, a master copy of the file system is resident in the host. The host software/agent initiates the following set of messages.

Init_filesystem(file system)—this message helps the storage device initialize a structure that refers to the specified host "file system."

Example: Init_filesystem(UFS1)

Set_fileupdate (file system, filename, properties, <LBA list>)—this message provides a file-system, filename, properties of this file, and an ordered list of LBA's containing the data associated with this file. This results in updating the device file system with the file name to LBA mapping for the given filename.

Example: Init_fileupdate(UFS1, explorer.exe, properties (hrwx,dr), <10, . . . 112>)

The "hrwx" indicates that the host properties include reading, writing, and executing the file. The "dr" indicates that the storage device properties include reading the file.

Get_fileupdate(file system, filename)—this message provides a file system and a filename. This results in returning to the host with all the data associated with this file including changes to this file that is cached in the storage device. The size of this cache can be set based on expected usages of the storage device aware files. On completion of responding to this message, the cache associated with this filename is flushed and the resulting storage is reclaimed for future use.

Example: Get_fileupdate(UFS1, results.out)

A file system field provides the device file system agent a pointer to a file system that is being referred to in the particular message. Since multiple operating systems and hence file systems can be resident in a storage device, this field helps distinguish the file systems. A properties field captures the key host properties associated with a file and also the device properties of this file including a device read, a device write, and a device execute. The device read enables the device file system to read the file. The device write enables the device file system to write the file. The device execute enables the device file system to allow execution of the file.

The device file system organization is provided at the device level with the files being organized as a searchable collection of file names and each record in this collection point to all the meta information associated with that particular record (filename). This collection could be implemented as flat data structure with a sequential search to arrive at the needed file. Another implementation of this collection could be as an indexed data structure with binary search support to access/update a needed file.

A host to storage device communication implementation depends on the type of host system and thus the actual means of implementing the communication messages may vary. For example, the AV/AM software of the ISV is responsible for securely communicating with the storage device. This software deciphers the file to sector association and sends appropriate requests to the storage device using the communication protocols. A backend server may be used for provisioning keys into the storage device for authentication and encryption purposes, setting and receiving data from the secure storage, and setting and receiving trusted block level data when the ISV performs a remote scan.

A client system (e.g., laptop, tablet) communication may be implemented using trusted-ATA commands over SATA or using vendor-unique commands over SATA. In a smartphone, this communication may be implemented using trusted-ATA commands over eMMC. Therefore, several different implementation options may arise, but the communication characteristics will be the same as discussed above.

In one embodiment, a system 100 includes a host file system 124 for organizing files and providing services to the system and a host agent (e.g., 125, 126) communicatively coupled to the host file system. A storage device 130 communicates with the host agent. The storage device includes a file awareness block 140 to provide an awareness of the host file system to the storage device. The host agent sends a pre-defined set of messages to the file awareness block to provide the awareness of the host file system to the storage device. The file awareness block includes a device file system to support a subset of services provided by the host file system.

The messages include an init_filesystem message to initialize the device file system that refers to the host file system, a set_fileupdate message to update the device file system with a file name to sector mapping for the file name of the host file system, and a get_fileupdate message to update the host file system with data associated with the file name that is stored in the device file system. The host agent communicates with the storage device to enable portability of the storage device across different types of host file systems.

In one embodiment, a storage device 130 includes a controller (e.g., access control 144) to manage input/output operations for the storage device, a host interface 134 for interfacing between the storage device and the host, and a file awareness block to provide an awareness of a host file system to the storage device. The file awareness block receives communications from a host agent (e.g., 125, 126) via host interface to provide the awareness of the host file system to the storage device. The file awareness block includes a device file system to support a subset of services provided by the host file system. The communications enable a background malware scan on the storage device, trusted operations in the storage device including a computation of hashes or a comparison of hash signatures, a backup file of the host file system to be visible to the device file system on the storage device, a file integrity check to be performed automatically via comparisons of hashes and data to baseline files stored on the storage device, and portability of the storage device across different types of host file systems.

Figure 2:
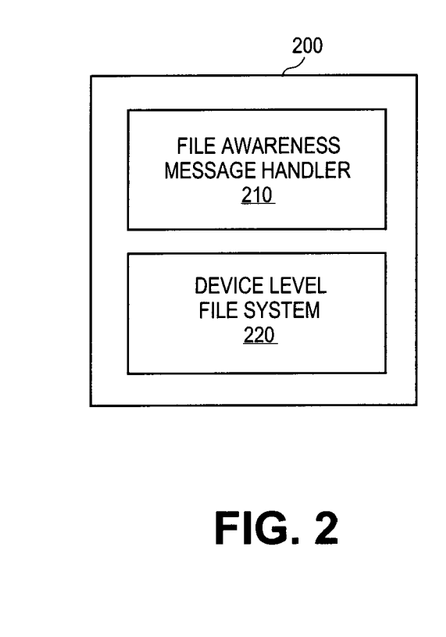
FIG. 2 illustrates a block diagram of a file awareness block in accordance with one embodiment of the invention.

FIG. 2 illustrates a block diagram of a file awareness block 200 in accordance with one embodiment of the invention. The file awareness block 200 (e.g., file awareness block 140) includes a file awareness message handler 210 for handling messages and a device level file system 220 for implementing a file system or portions of a file system in the storage device.

Figure 3:
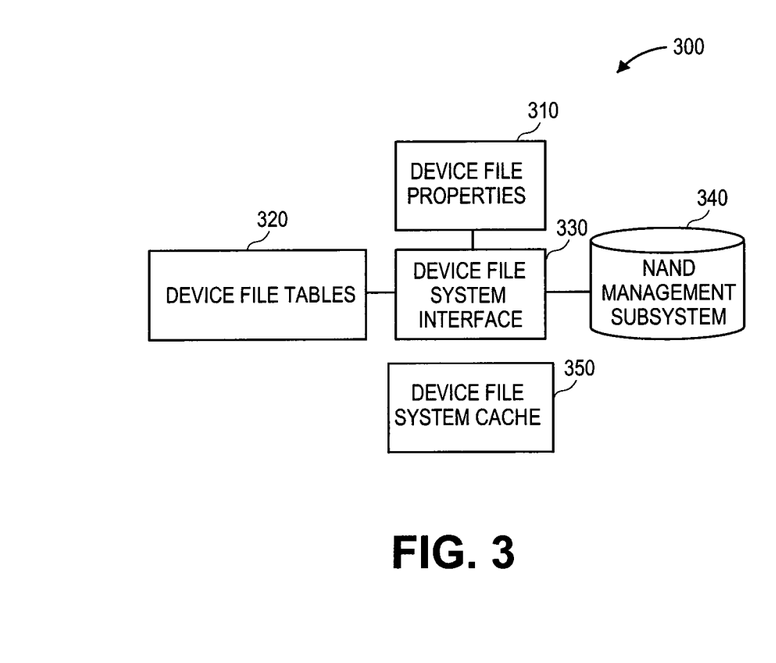
FIG. 3 illustrates a block diagram of a device level file system in accordance with one embodiment of the invention.

FIG. 3 illustrates a block diagram of a device level file system 300 in accordance with one embodiment of the invention. The device level file system 300 (e.g., device level file system 220) includes device file properties 310, device file tables 320, device file system interface 330, memory management subsystem (e.g., NAND management subsystem), and device file system cache 350.

A device file system has various usage scenarios such as background malware, trusted execution in storage, enabling portable storage, file rollbacks to last know good states or automated local backups, and file integrity check. These usage scenarios including how the above messages and file properties can be used to accomplish specific user or application tasks are described in conjunction with the methods of FIGS. 4-8.

Figure 4:
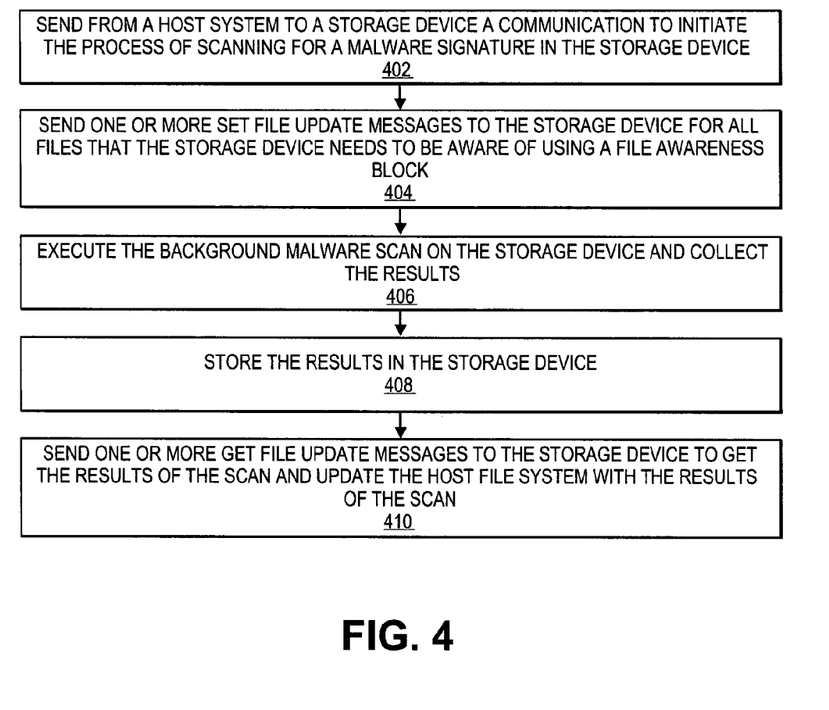
FIG. 4 illustrates a flow diagram of one embodiment for a computer-implemented method of performing a background malware scan on a system in accordance with one embodiment of the invention.

FIG. 4 illustrates a flow diagram of one embodiment for a computer-implemented method 400 of performing a background malware scan on a system in accordance with one embodiment of the invention. The method 400 is performed by processing logic that may include hardware (circuitry, dedicated logic, etc.), software (such as is run on a general purpose computer system or a dedicated machine or a device), or a combination of both. In one embodiment, the method 400 is performed by processing logic associated with the devices or systems discussed herein.

At block 402, a host system to storage device communication starts the process of scanning for a malware signature in the storage device. At block 404, the host agent sends one or more set file update messages to the storage device for all files that the storage device needs to be aware of using a file awareness block. Set file update (UFS1, explorer.exe, properties(hrwx,dr), <10, . . . 112>) is an example message. This message makes the explorer file visible to the device file system to be read by the storage device and it is resident at LBA range from 10 to 112. Set file update (UFS1, scan.exe, properties(hrwx,drx), <120, . . . 122>) is another example message, which makes the scan file visible to the device file system to be read and executed by the storage device and it is resident at LBA range from 120 to 122. Next, the background malware scan is executed on the storage device and the results are collected at block 406 using processing logic. At block 408, the processing logic may store the results in the storage device cache. At block 410, the host agent sends one or more get file update messages to the storage device to get the results of the scan and update the host file system with the results of the scan. A get file update (UFS1, results.out) message will make the data associated with results.out file visible to the host file system. If there are updates to this file since the last write to this file by the host then the host file tables are updates to reflect these changes.

Figure 5:
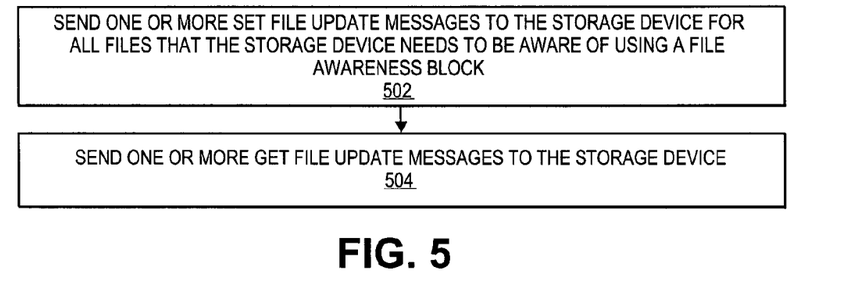
FIG. 5 illustrates a flow diagram of one embodiment for a computer-implemented method of performing trusted operations on a system in accordance with one embodiment of the invention.

FIG. 5 illustrates a flow diagram of one embodiment for a computer-implemented method 500 of performing trusted operations on a system in accordance with one embodiment of the invention. The method 500 is performed by processing logic that may include hardware (circuitry, dedicated logic, etc.), software (such as is run on a general purpose computer system or a dedicated machine or a device), or a combination of both. In one embodiment, the method 500 is performed by processing logic associated with the devices or systems discussed herein.

Host to device communication can be used to accomplish trusted operations in the storage device such as computation of hashes or comparison of hash signatures. At block 502, the host agent sends one or more set file update messages to the storage device for all files that the storage device needs to be aware of using a file awareness block. For example, the set file update (UFS1, source1.exe, properties(hrwx,dr), <10, . . . 112>) message will make the source1.exe file visible to the device file system to be read by the device and it is resident at LBA range from 10 to 112. A set file update (UFS1, src1hash.out, properties(hrwx,drw), <120, . . . 122>) message will make the src1hash.out file visible to the device file system to be read by the device and it is resident at LBA range from 120 to 122.

At block 502, the host agent sends one or more get file update messages to the storage device. For example, the get file update (UFS1, src1hash.out) message will make the data associated with src1hash.out file visible to the host file system. If there are updates to this file since the last write to this file by the host then the host file tables are updates to reflect these changes.

Figure 6:
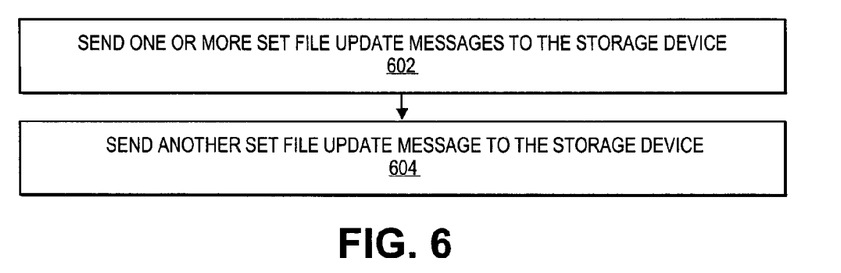
FIG. 6 illustrates a flow diagram of one embodiment for a computer-implemented method of enabling portable storage on a system in accordance with one embodiment of the invention.

FIG. 6 illustrates a flow diagram of one embodiment for a computer-implemented method 600 of enabling portable storage on a system in accordance with one embodiment of the invention. The method 600 is performed by processing logic that may include hardware (circuitry, dedicated logic, etc.), software (such as is run on a general purpose computer system or a dedicated machine or a device), or a combination of both. In one embodiment, the method 600 is performed by processing logic associated with the devices or systems discussed herein.

Host to device communication can enable portability of the storage device across different host file systems. In one embodiment, a storage device that is plugged into a Windows file client system (ntfs1) will communicate to the device file system. Next, this storage is removed and then plugged into a MMC slot in a smartphone. The operations below show how the device file system will seamlessly communicate with the 2 different hosts.

At block 602, the host agent sends one or more set file update messages to the storage device. For example, the set file update (NTFS1, adobe.exe, properties(hrwx,dr), <10, ... 112>) message makes the adobe.exe file visible to the device file system to be read by the device and it is resident at LBA range from 10 to 112. Then, the storage device is removed and plugged into a smartphone with a different file system (e.g., an Android smartphone). The operation below will update the device with the location of "adobe.exe" in the smartphone. At block 604, the host agent sends the set file update (Android1, adobe.exe, properties (hrwx,dr), <120, ... 122>) message to the storage device. This message makes the srclhash.out file visible to the device file system to be read by the device and it is resident at LBA range from 120 to 122. Note that the storage device will maintain separate structures for each type of host "mounted" on this storage device.

Figure 7:
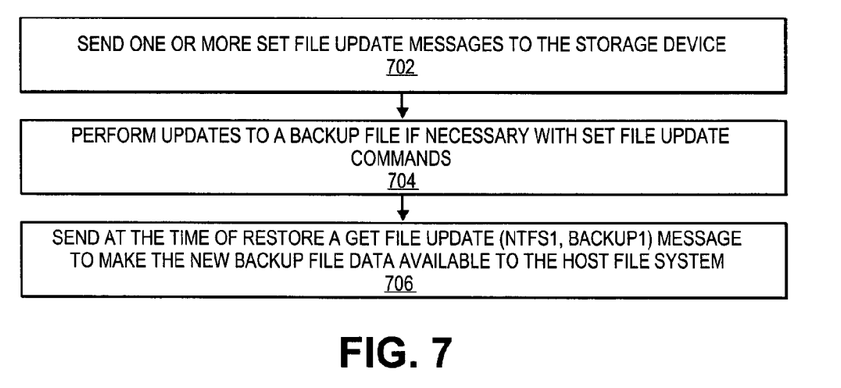
FIG. 7 illustrates a flow diagram of one embodiment for a computer-implemented method of performing file rollbacks to last known good states or automated local backups on a system in accordance with one embodiment of the invention.

FIG. 7 illustrates a flow diagram of one embodiment for a computer-implemented method 700 of performing file rollbacks to last known good states or automated local backups on a system in accordance with one embodiment of the invention. The method 700 is performed by processing logic that may include hardware (circuitry, dedicated logic, etc.), software (such as is run on a general purpose computer system or a dedicated machine or a device), or a combination of both. In one embodiment, the method 700 is performed by processing logic associated with the devices or systems discussed herein.

Applications can use custom commands and policies to restore and recover files to their last known good state as well as to provide local automated file backup and recovery services/capabilities. At block 702, the host agent sends one or more set file update messages to the storage device. For example, the set file update (NTFS1, backup1, properties (hrwx,dr), <1, ... 1120>) message makes the backup file visible to the device file system to be read by the device and it is resident at LBA range from 1 to 1120. Any further updates to the backup file can be performed with set file update commands if necessary at block 704. At the time of restore, a get file update (NTFS1, backup1) message makes the new backup file data available to the host file system at block 706.

Figure 8:
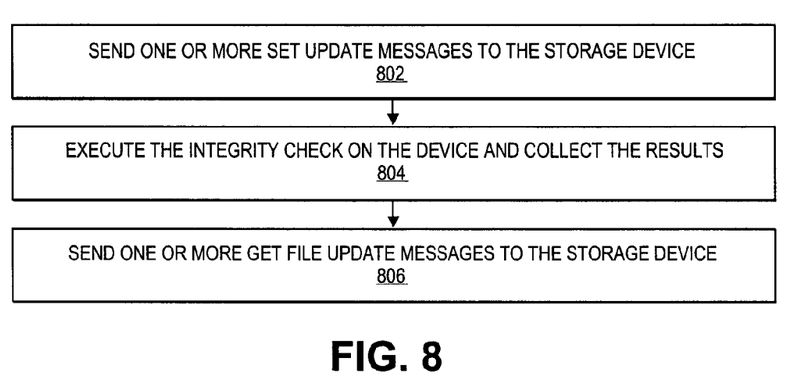
FIG. 8 illustrates a flow diagram of one embodiment for a computer-implemented method of performing a file integrity check on a system in accordance with one embodiment of the invention.

FIG. 8 illustrates a flow diagram of one embodiment for a computer-implemented method 800 of performing a file integrity check on a system in accordance with one embodiment of the invention. The method 800 is performed by processing logic that may include hardware (circuitry, dedicated logic, etc.), software (such as is run on a general purpose computer system or a dedicated machine or a device), or a combination of both. In one embodiment, the method 800 is performed by processing logic associated with the devices or systems discussed herein.

Applications can use and harness commands and policies to carry out file integrity checks for files to detect malicious as well as undesired, non-malicious, changes to files and data. The checks can be done locally for security and information technology (IT) compliance and management purpose. Integrity checks can be carried out automatically (policy based) via comparisons of the files and data to baseline files and data located and/or comparisons of hashes of the files and data to a baseline of trusted hashes. The baseline data (e.g., files, data, databases, and hashes) can be stored by ISV in secure storage areas located on the storage device.

At block 802, the host agent sends one or more set update messages to the storage device. For example, the set file update (UFS1, explorer.exe, properties(hrwx,dr), <10, ... 112>) message makes the explorer file visible to the device file system to be read by the device and it is resident at LBA range from 10 to 112. A set file update (UFS1, integrity_checker.exe, properties(hrwx,drx), <120, ... 122>) message makes the integrity checker file visible to the device file system to be read and executed by the device and it is resident at LBA range from 120 to 122. Next, the integrity check is executed on the device and the results collected at block 804. The host agent sends one or more get file update messages to the storage device at block 806. For example, the get file update (UFS1, integrity_check_results.out) message makes the data associated with results.out file visible to the host file system. If there are updates to this file since the last write to this file by the host then the host file tables are updates to reflect these changes.

The integrity check can also be carried out by ISV via access to trusted information accessed directly by ISV over trusted (and if needed) encrypted communication including hashes of files calculated and securely stored by the firmware used to manage the data-storage subsystem in a secure storage area of the drive.

FIGS. 9-12 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 9:
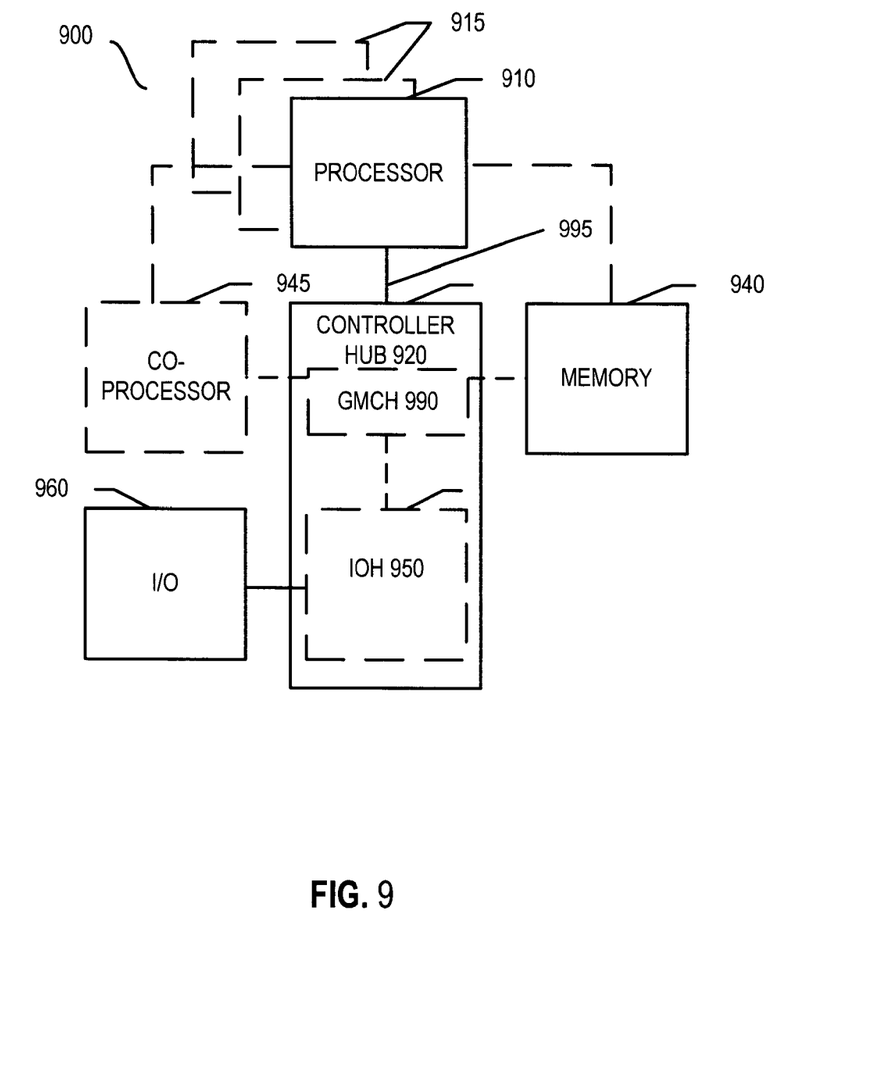
FIG. 9 is a block diagram of a system in accordance with one embodiment of the invention.

Referring now to FIG. 9, shown is a block diagram of a system 900 in accordance with one embodiment of the present invention. The system 900 may include one or more processors 910, 915, which are coupled to a controller hub 920. In one embodiment the controller hub 920 includes a graphics memory controller hub (GMCH) 990 and an Input/Output Hub (IOH) 950 (which may be on separate chips); the GMCH 990 includes memory and graphics controllers to which are coupled memory 940 and a coprocessor 945; the IOH 950 is couples input/output (I/O) devices 960 to the GMCH 990. Alternatively, one or both of the memory and graphics controllers are integrated within the processor (as described herein), the memory 940 and the coprocessor 945 are coupled directly to the processor 910, and the controller hub 920 in a single chip with the IOH 950. The GMCH 990 may also be coupled to a storage device (e.g., storage device 130, non-volatile memory) as discussed herein.

The optional nature of additional processors 915 is denoted in FIG. 9 with broken lines. Each processor 910, 915 may include one or more of the processing cores described herein.

The memory 940 may be, for example, dynamic random access memory (DRAM), phase change memory (PCM), or a combination of the two. For at least one embodiment, the controller hub 920 communicates with the processor(s) 910, 915 via a multi-drop bus, such as a frontside bus (FSB), point-to-point interface such as QuickPath Interconnect (QPI), or similar connection 995.

In one embodiment, the coprocessor 945 is a special-purpose processor, such as, for example, a high-throughput MIC processor, a network or communication processor, compression engine, graphics processor, GPGPU, embedded processor, or the like. In one embodiment, controller hub 920 may include an integrated graphics accelerator.

There can be a variety of differences between the physical resources 910, 915 in terms of a spectrum of metrics of merit including architectural, microarchitectural, thermal, power consumption characteristics, and the like.

In one embodiment, the processor 910 executes instructions that control data processing operations of a general type. Embedded within the instructions may be coprocessor instructions. The processor 910 recognizes these coprocessor instructions as being of a type that should be executed by the attached coprocessor 945. Accordingly, the processor 910 issues these coprocessor instructions (or control signals representing coprocessor instructions) on a coprocessor bus or other interconnect, to coprocessor 945. Coprocessor(s) 945 accept and execute the received coprocessor instructions.

Figure 10:
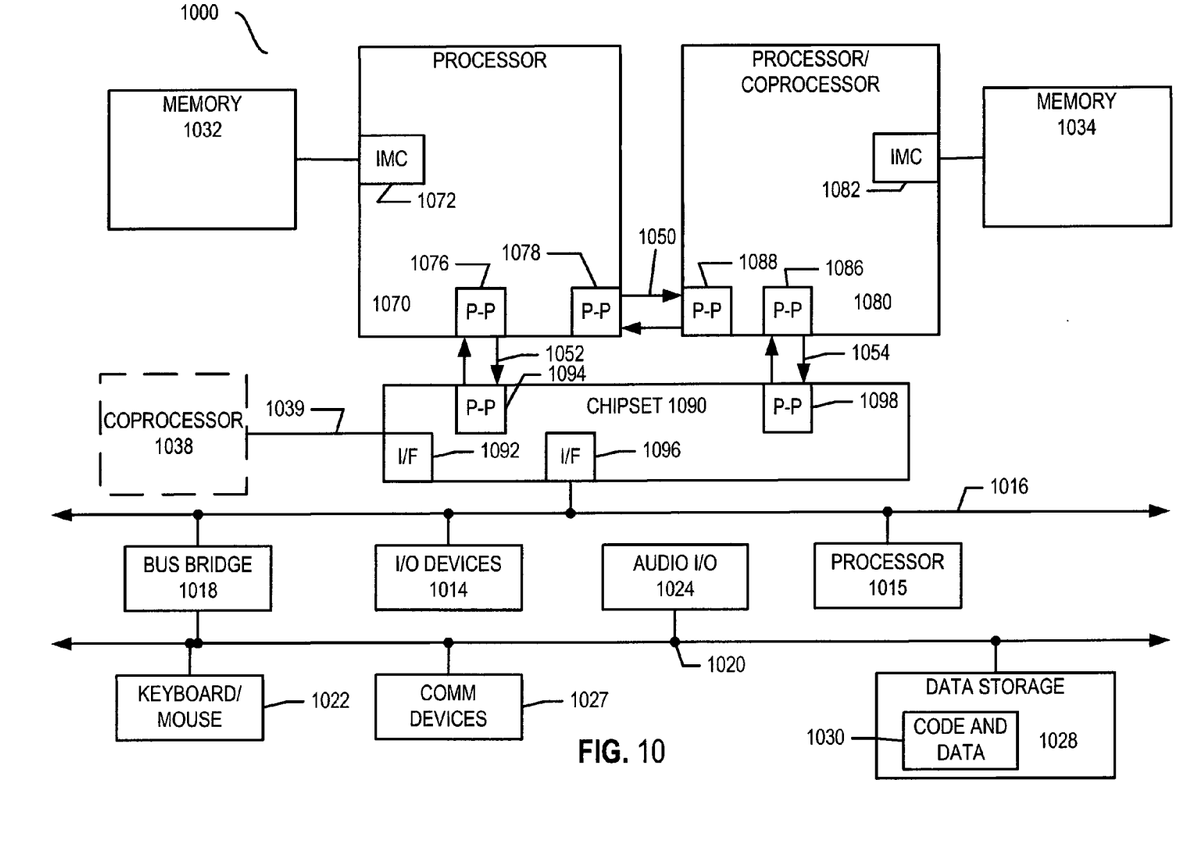
FIG. 10 is a block diagram of a second system in accordance with an embodiment of the invention.

Referring now to FIG. 10, shown is a block diagram of a first more specific exemplary system 1000 in accordance with an embodiment of the present invention. As shown in FIG. 10, multiprocessor system 1000 is a point-to-point interconnect system, and includes a first processor 1070 and a second processor 1080 coupled via a point-to-point interconnect 1050. In one embodiment of the invention, processors 1070 and 1080 are respectively processors 910 and 915, while coprocessor 1038 is coprocessor 945. In another embodiment, processors 1070 and 1080 are respectively processor 910 and coprocessor 945.

Processors 1070 and 1080 are shown including integrated memory controller (IMC) units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may optionally exchange information with the coprocessor 1038 via a high-performance interface 1039. In one embodiment, the coprocessor 1038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present invention is not so limited.

As shown in FIG. 10, various I/O devices 1014 may be coupled to first bus 1016, along with a bus bridge 1018 which couples first bus 1016 to a second bus 1020. In one embodiment, one or more additional processor(s) 1015, such as coprocessors, high-throughput MIC processors, GPGPU's, accelerators (such as, e.g., graphics accelerators or digital signal processing (DSP) units), field programmable gate arrays, or any other processor, are coupled to first bus 1016. In one embodiment, second bus 1020 may be a low pin count (LPC) bus. Various devices may be coupled to a second bus 1020 including, for example, a keyboard and/or mouse 1022, communication devices 1027 and data storage 1028 (e.g., storage device as described herein, storage device 130 of FIG. 1) such as a disk drive or other mass storage device which may include instructions/code and data 1030, in one embodiment. Further, an audio I/O 1024 may be coupled to the second bus 1020. Note that other architectures are possible. For example, instead of the point-to-point architecture of FIG. 10, a system may implement a multi-drop bus or other such architecture.

Figure 11:
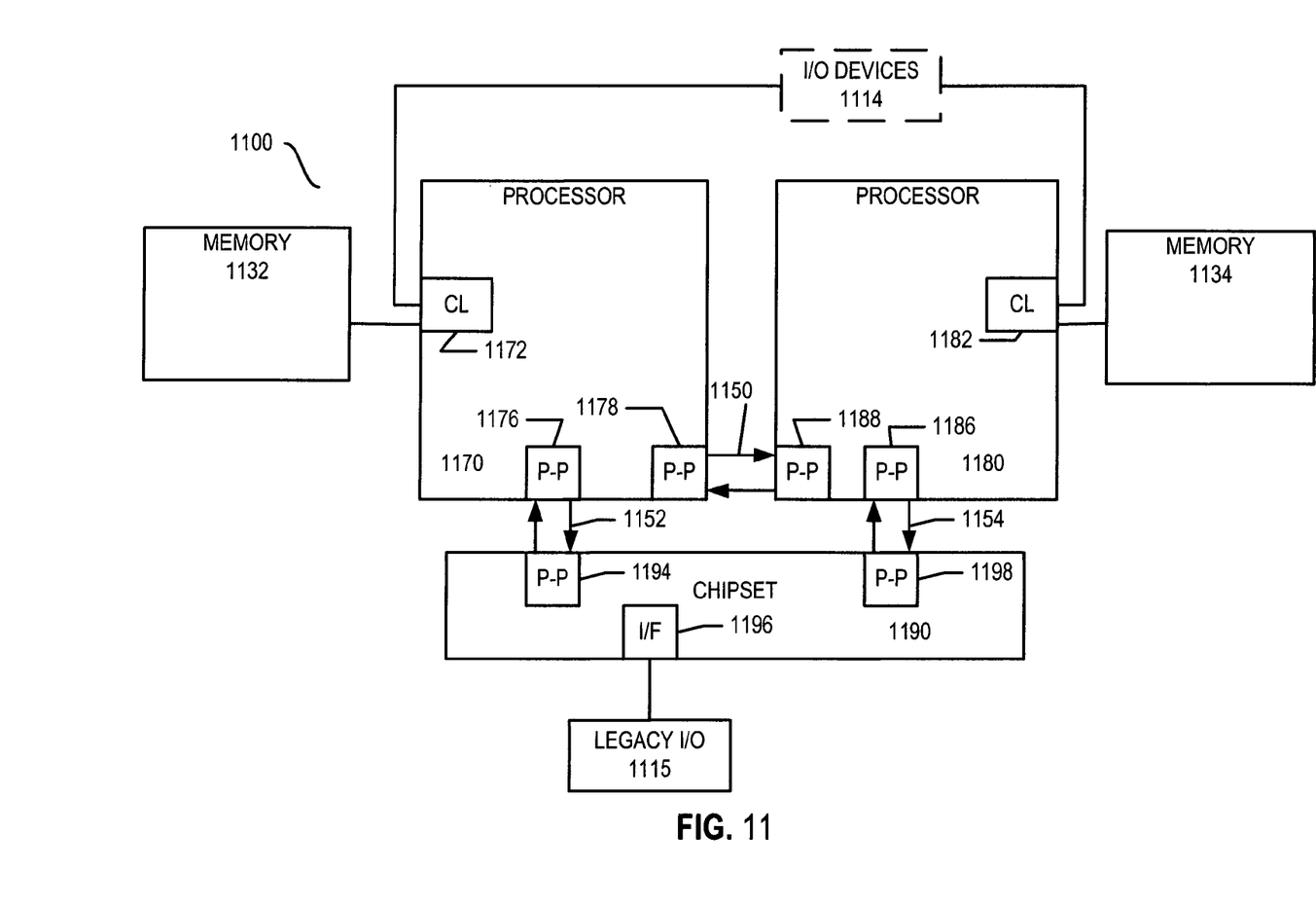
FIG. 11 is a block diagram of a third system in accordance with an embodiment of the invention.

Referring now to FIG. 11, shown is a block diagram of a second more specific exemplary system 1100 in accordance with an embodiment of the present invention. Like elements in FIGS. 10 and 11 bear like reference numerals, and certain aspects of FIG. 10 have been omitted from FIG. 11 in order to avoid obscuring other aspects of FIG. 11. FIG. 11 illustrates that the processors 1170, 1180 may include integrated memory and I/O control logic ("CL") 1172 and 1182, respectively. Thus, the CL 1172, 1182 include integrated memory controller units and include I/O control logic. FIG. 11 illustrates that not only are the memories 1132, 1134 coupled to the CL 1172, 1182, but also that I/O devices 1114 are also coupled to the control logic 1172, 1182. Legacy I/O devices 1115 are coupled to the chipset 1190. The memories 1132, 1134 may include non-volatile memory such as the storage device discussed herein (e.g., storage device 130 of FIG. 1).

Figure 12:
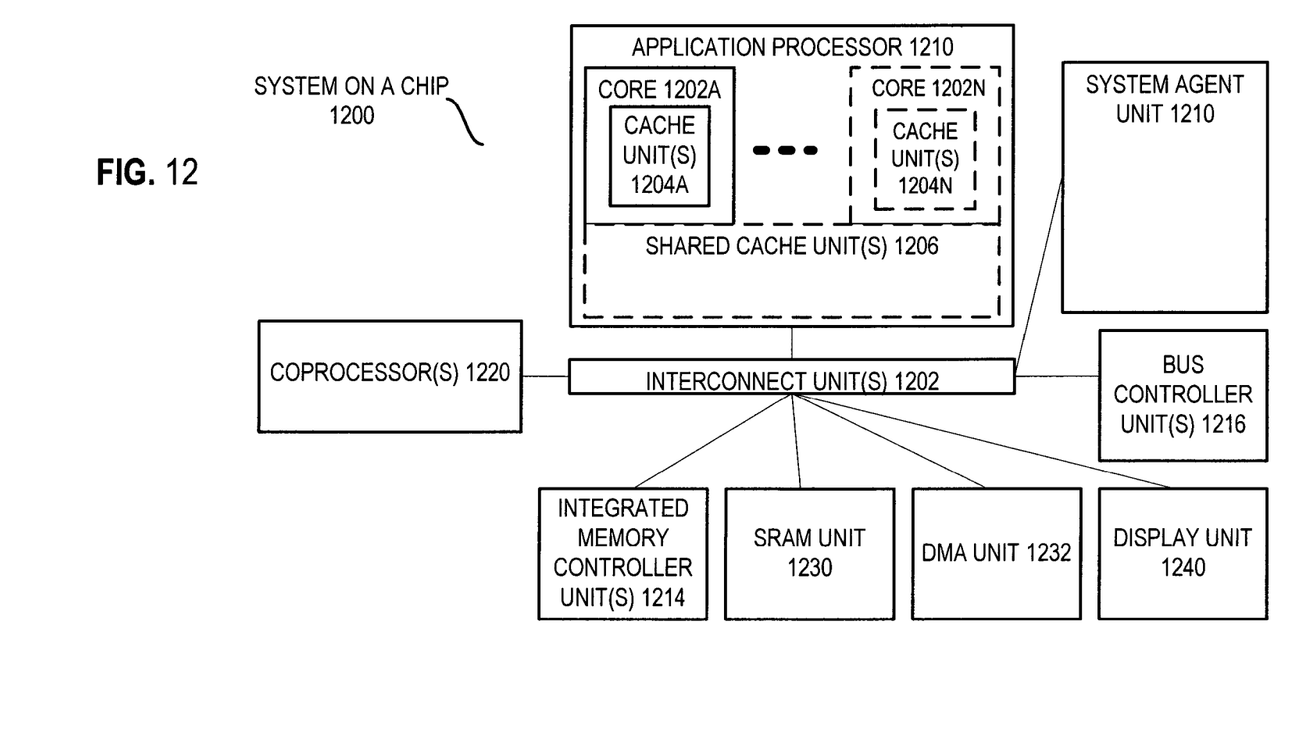
FIG. 12 illustrates a block diagram illustrating a system on a chip implemented in accordance with one embodiment of the invention.

Referring now to FIG. 12, shown is a block diagram of a SoC 1200 in accordance with an embodiment of the present invention. Also, dashed lined boxes are optional features on more advanced SoCs. In FIG. 12, an interconnect unit(s) 1202 is coupled to: an application processor 1210 which includes a set of one or more cores 1202A-N and shared cache unit(s) 1206; a system agent unit 1210; a bus controller unit(s) 1216; an integrated memory controller unit(s) 1214; a set or one or more coprocessors 1220 which may include integrated graphics logic, an image processor, an audio processor, and a video processor; an static random access memory (SRAM) unit 1230; a direct memory access (DMA) unit 1232; and a display unit 1240 for coupling to one or more external displays. In one embodiment, the coprocessor(s) 1220 include a special-purpose processor, such as, for example, a network or communication processor, compression engine, GPGPU, a high-throughput MIC processor, embedded processor, or the like. The SoC 1200 may include or be coupled to a storage device as described herein.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1030 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Figure 13:
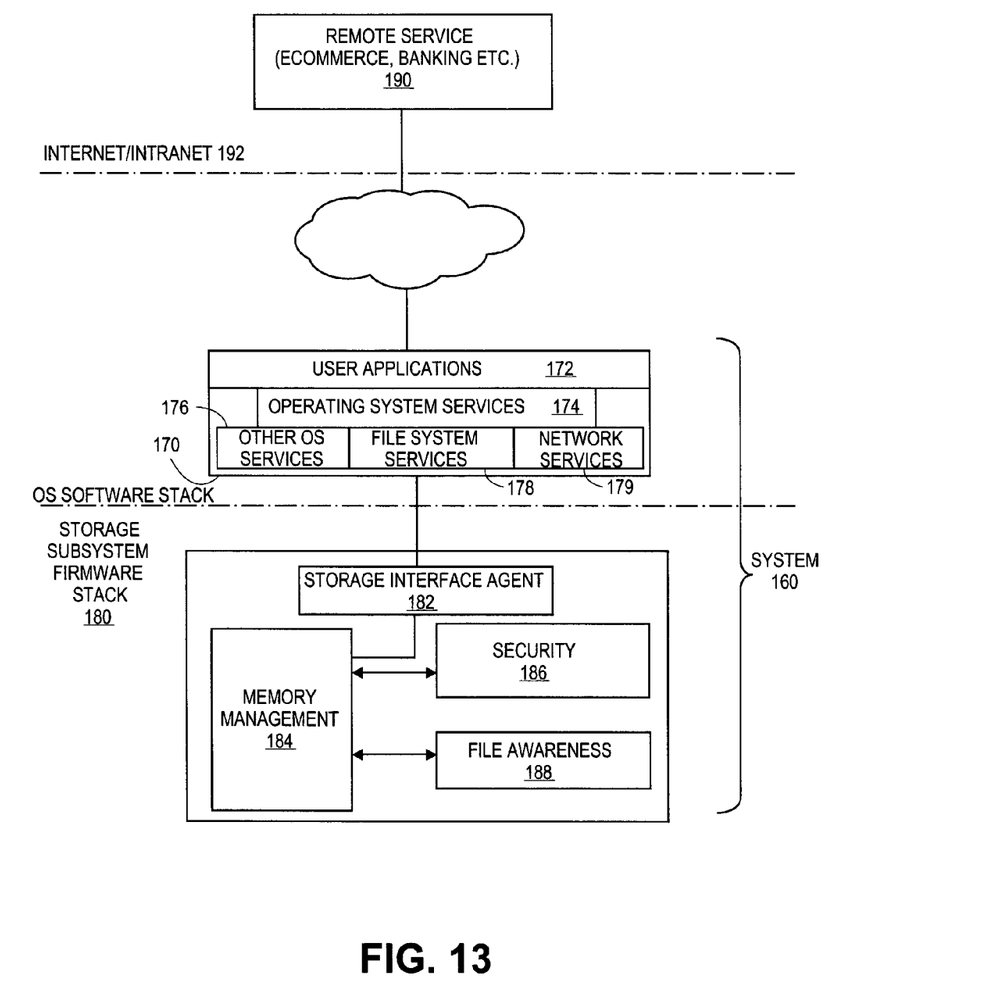
FIG. 13 illustrates a system having dynamic file system awareness in a storage device of the system in accordance with one embodiment of the invention.

FIG. 13 illustrates a system having dynamic file system awareness in a storage device of the system in accordance with one embodiment of the invention. The host operating system software stack 170 of the system 160 includes user applications 172, OS services 174, other OS services 176, file system services 178, and network services 179. The OS software stack in the host system 160 is communicatively coupled to a storage interface agent 182 of a storage subsystem firmware stack 180. The stack 180 includes a file awareness block 188, a security block 180 that has security routines (e.g., full disk encryption, storage security features), and a memory management block 184 that has management routines such as wear-leveling, logical to physical mapping, etc. The file awareness block 188 is used for implementing methods as discussed herein. The system 160 may also be coupled to a remote service 190 (e.g., ecommerce, banking, etc.) via an internet/intranet network 192.

It should be appreciated that reference throughout this specification to "one embodiment" or "an embodiment" means that a particular feature, structure or characteristic described in connection with the embodiment is included in at least one embodiment. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments.

In the above detailed description of various embodiments, reference is made to the accompanying drawings, which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in the art to practice the teachings disclosed herein. Other embodiments may be utilized and derived there from, such that structural and logical substitutions and changes may be made without departing from the scope of this disclosure. The following detailed description, therefore, is not to be taken in a limiting sense, and the scope of various embodiments is defined only by the appended claims, along with the full range of equivalents to which such claims are entitled.

What is claimed is:

1. A system, comprising:
   a host file system for organizing files and providing services to the system;
   a host agent communicatively coupled to the host file system; and
   a hardware data storage device to communicate with the host agent, wherein the hardware data storage device to include a file awareness block to provide an awareness of the host file system to the data storage device and to provide a subset of services provided by the host file system, wherein the host agent to send a defined set of messages to the file awareness block to provide the awareness of the host file system to the hardware storage device, the set of messages comprising a get file update message that specifies a file name, the get file update message to cause an update to the host file system with data associated with the file name that is stored in the device file system.

2. The system of claim 1, wherein the set of messages comprise an initialize file system message to initialize the device file system that refers to the host file system.

3. The system of claim 2, wherein the set of messages further comprise a set file update message to update the device file system with a file name to sector mapping for the file name of the host file system.

4. The system of claim 1, wherein the host agent to communicate with the storage device to enable portability of the storage device across different types of host file systems.

5. A hardware data storage device comprising:
   a host interface to interface between a host and the hardware storage device; and
   a file awareness block communicatively coupled to the host interface, the file awareness block to provide an awareness of a host file system of the host to the storage device and to provide a subset of services provided by the host file system, wherein the data storage device to receive a defined set of messages from the host file system, the set of messages comprising a get file update message that specifies a file name, the get file update message to cause an update to the host file system with data associated with the file name that is stored in the device file system.

6. The storage device of claim 5, wherein the communications enable a background malware scan on the storage device.

7. The storage device of claim 5, wherein the communications enable trusted operations in the storage device including a computation of hashes or a comparison of hash signatures.

8. The storage device of claim 5, wherein the communications enable a backup file of the host file system to be visible to the device file system of the storage device.

9. The storage device of claim 5, wherein the communications enable a file integrity check to be performed automatically via comparisons of hashes and data to baseline files stored on the storage device.

10. The storage device of claim 5, wherein the communications to enable portability of the storage device across different types of host file systems.

11. A computer-implemented method, comprising:
sending a communication from a host to a storage device to initiate a scan for a malware signature in the storage device; and
sending one or more messages from the host to the storage device for all files located in a host file system such that the storage device is made aware of these files including a get file update message to the storage device to get the results of the scan and update the host file system with the results of the scan, wherein the get file update message make the results associated with the scan file visible to the host file system; and
executing the malware scan on the storage device.

12. The computer-implemented method of claim 11, further comprising:
storing results of the malware scan in the storage device.

13. The computer-implemented method of claim 12, wherein the one or more messages comprises a set file update message that indicates the host file system, a file in the host file system, and properties of the host in regards to the file and also properties of the storage device in regards to the file, wherein the set file update message makes the indicated file visible to a device file system located in the storage device.

14. The computer-implemented method of claim 12, wherein the one or more messages comprises a set file update message that indicates the host file system, a scan file in the host file system, and properties of the host in regards to the scan file and also properties of the storage device in regards to the scan file, wherein the set file update message makes the indicated scan file visible to a device file system located in the storage device.

* * * * *